Figure 1:
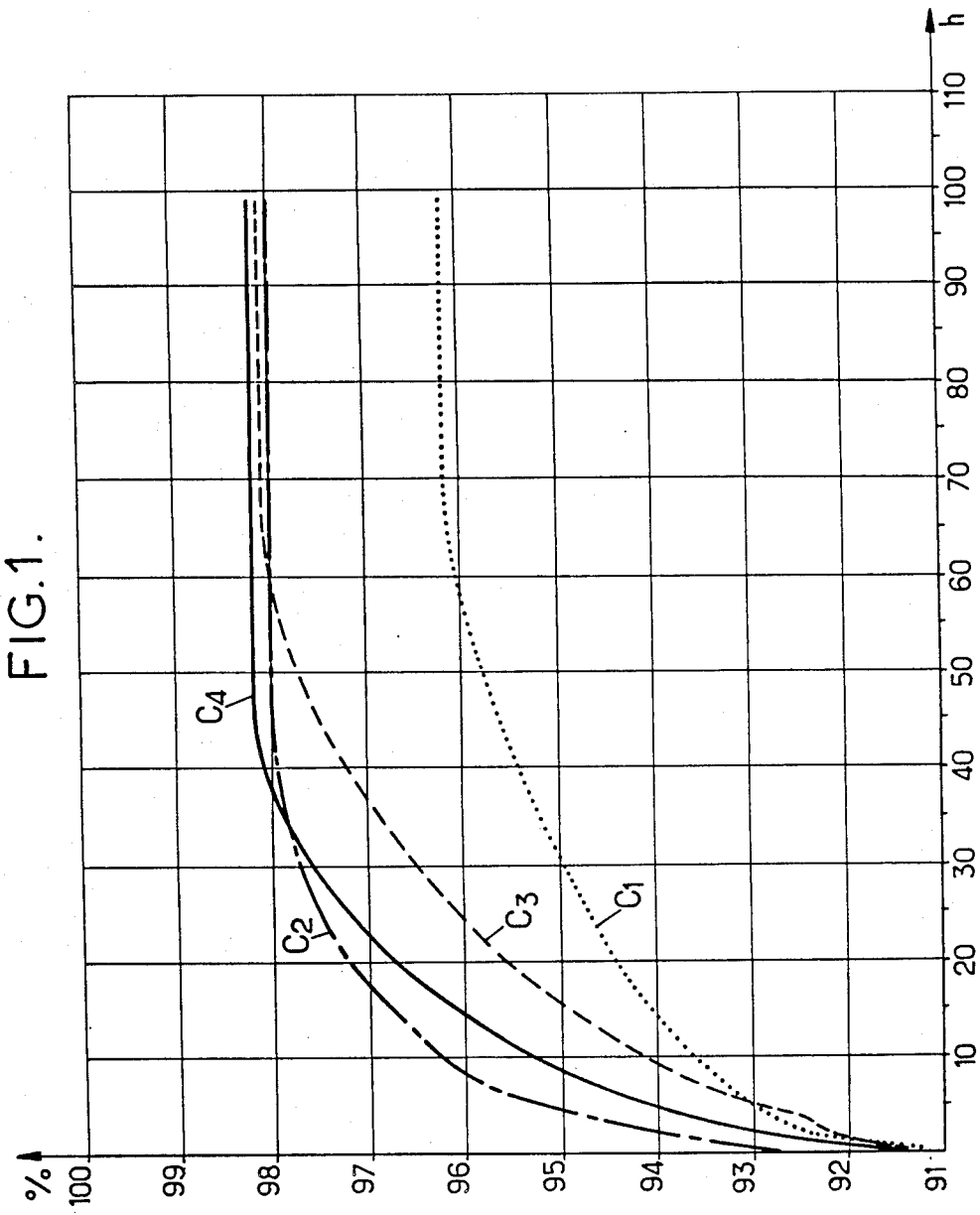

:::{.patent-header}
United States Patent [19]

Serpelloni

[11] Patent Number: 4,620,982

[45] Date of Patent: Nov. 4, 1986
:::

[54] PASTILLES OF THE LOZENGE TYPE BASED ON CRYSTALLINE SORBITOL OR FRUCTOSE AND PROCESS FOR THEIR MANUFACTURE

[75] Inventor: Michel Serpelloni, Bethune, France

[73] Assignee: Roquette Freres, France

[21] Appl. No.: 561,919

[22] Filed: Dec. 15, 1983

[30] Foreign Application Priority Data

Dec. 17, 1982 [FR] France ............... 82 21270

[51] Int. Cl.⁴ ............................................. A23G 3/00
[52] U.S. Cl. ....................................... 426/658; 426/660; 426/564; 426/454; 426/456; 426/473; 426/573; 426/576; 426/804; 426/572
[58] Field of Search ............... 426/564, 454, 658, 456, 426/660, 573, 804, 576, 473

[56] References Cited

U.S. PATENT DOCUMENTS

| | | | |
|---|---|---|---|
| 1,450,865 | 4/1923 | Pelc | 426/660 |
| 1,601,302 | 9/1926 | Farley | 426/572 |
| 2,082,312 | 6/1937 | Todd | 426/660 |
| 3,677,770 | 7/1972 | Witzel | 99/134 R |
| 3,835,226 | 9/1974 | Rostagno | 426/660 |
| 3,908,032 | 9/1975 | Didelot | 426/660 |
| 4,012,333 | 3/1977 | Towle | 426/660 |
| 4,127,645 | 11/1978 | Witzel et al. | 424/44 |
| 4,140,804 | 2/1979 | Seymour | 426/660 |
| 4,241,092 | 12/1980 | Halik | 426/96 |
| 4,289,794 | 9/1981 | Kleiner et al. | 426/660 |
| 4,324,107 | 4/1982 | Pipe et al. | 62/268 |

FOREIGN PATENT DOCUMENTS

| | | | |
|---|---|---|---|
| 924052 | 4/1963 | United Kingdom . | |
| 0668660 | 6/1979 | U.S.S.R. | 426/660 |

OTHER PUBLICATIONS

"*Confectionery Production*", Nov. 1974, vol. 40, No. 11, pp. 516–520.

*Primary Examiner*—Jeanette Hunter
*Attorney, Agent, or Firm*—Larson and Taylor

[57] ABSTRACT

Pastilles of the lozenge type based on crystalline sorbitol or fructose including, in their constituent mass, a plurality of cavities, preferably microcavities, of which some at least communicate with the surface.

6 Claims, 2 Drawing Figures

PASTILLES OF THE LOZENGE TYPE BASED ON CRYSTALLINE SORBITOL OR FRUCTOSE AND PROCESS FOR THEIR MANUFACTURE

The invention relates to pastilles of the lozenge type based on crystalline sorbitol or fructose. It also relates to the process of manufacturing these products.

By the expression "pastilles of the lozenge type"—lozenge being a term of Anglo-Saxon origin which is applied in the industries of confectionery and pharmaceutical products—is meant products which are traditionally obtained from a dough based on finely ground saccharose. This dough, which comprises a binder ensuring adhesion between the saccharose crystals, is aromatized and, as the case may be, supplemented by active pharmaceutical principles; then it is brought by rolling and cutting up into its final form of a pastille of the lozenge type which is dried in order to remove the water which has necessarily been added at the time of the preparation of the starting dough.

The binder may be constituted by a mixture of gums and/or gelatin and, possibly, starch.

Pastilles of the lozenge type must have a smooth surface and a homogeneous texture.

The intimate mixing between the bonding liquid, particularly water, and the powdered constituents, namely, the sugar and the binder, and all other possible ingredients, can be carried out in a device of the kneader type or of the extruder type.

The dough resulting from this mixing operation is brought by rolling into the form of a layer of thickness selected in advance and once the surface of the dough is sufficiently hard and dry to avoid any sticking to the cutting-up tools—which hardening is generally obtained by blowing hot and/or cold air followed possibly by powdering by means, for example, of starch, of fecula or potatoe starch or of mannitol—the pastilles of the lozenge type are cut to the desired shape before proceeding with their drying.

The drying is in general effected in ovens with an atmosphere of regulatable temperature and humidity, in general in sequence, in order to facilitate a uniform texture of the finished product, the drying temperatures being in general less than 50° C. and the time of drying less than 72 hours.

To fix ideas, there is indicated below, by way of example, the composition of a dough for the manufacture of lozenges based on saccharose

| icing sugar | 89.64 parts by weight |
| gelatin | 0.50 parts by weight |
| gum arabic | 1.58 parts by weight |
| gum tragacanth (with 11.1% of dry matter) | 0.05 parts by weight |
| water | 7.23 parts by weight |
| potato starch (powdering) | 1.00 parts by weight |
| aroma and colouring | q.s.p. |

It is pointed out that saccharose often occurs in admixture with dextrose or glucose syrup and sometimes small amounts of sorbitol or of glycerol are found therein as moistening agents delaying drying to lead to a regularly dried product.

There exist pastilles of the "sugarless" lozenge type in which the saccharose, the dextrose, the glucose syrups, the starches and the like are replaced by particularly polyols such as xylitol, mannitol and hydrogenated starch hydrolysates.

It has also already been proposed to replace in these "sugarless" lozenges, the saccharose by sorbitol (cf. Confectionary Production, May 1971: pages 289 to 291 and January 1973: pages 14, 16 and 45).

However, pastilles of the lozenge type based on sorbitol, as well as those based on fructose, have been avoided by manufacturers because their final texture is not satisfactory by reason of the fact that it is impossible to carry out uniform drying "in the mass" of these products.

Not only the doughs based on sorbitol or fructose, after cutting up and stoving, are wrinkled and irregular at the surface, but in addition the inner part of the dough is always wet.

Now, if they were usable, sorbitol and fructose would permit respectively a very economic production of pastilles of the "sugarless" lozenge type (sorbitol) and pastilles of the dietetic lozenge type (fructose).

Applicant Company has had the merit of having found that after drying the pastilles of the lozenge type based on sorbitol or on fructose constitute quite a satisfactory product, dry in the mass and with an even surface, provided that their constituent mass includes a plurality of cavities, preferably microcavities, at least some of which communicate with the surface.

Consequently, the pastilles of lozenge type based on sorbitol or fructose according to the invention are characterized by the fact that they comprise, in their constituent mass, a plurality of cavities, preferably a plurality of microcavities, at least certain ones of which communicate with the surface.

Due to the fact of the presence of these cavities, the lozenges according to the invention have an apparent density, determined on the finished product after drying, particularly in corn oil, less than that of lozenges manufactured according to a conventional formula.

In consequence, the pastilles of lozenge type according to the invention which comprise a plurality of cavities, preferably microcavities, at least some of which communicate with the surface, are moreover characterized by the fact that their density is less by at least 5% and, preferably, by at least 8% and at the most by 50%, than that of lozenges manufactured according to conventional formulae.

The process according to the invention for the preparation of the pastilles of lozenge type according to the invention is characterized by the fact that recourse is had to means suitable for conferring after rolling, on the constituent mass of the pastilles a plurality of cavities, preferably microcavities, at least some of which communicate with the surface.

Preferably, the means suitable for conferring on the constituent mass of the pastilles after rolling a plurality of cavities is constituted by a substance incorporated in the constituent dough of the pastilles and which can give rise, under the action of the heat applied at the time of the drying step and/or possibly under the action of a chemical agent, to a gaseous release within the dough, at a plurality of places at the site of which as many cavities, preferably microcavities, are then formed, at least some of which communicate with the surface.

According to an advantageous embodiment, the abovesaid substance is constituted by carbonate, particularly sodium bicarbonate, and the chemical agent suitable for causing the decomposition of the carbonate with the release of $CO_2$ can be an acid particularly an organic acid compatible with use in confectionery or in the pharmaceutical industry.

According to another advantageous embodiment, the means suitable for conferring the cavities on the starting dough may be a physical means, particularly a roller provided with pins, applied to the dough after rolling or any other equivalent means.

The invention, which contemplates yet other advantageous embodiments which will be more explicitly considered below will be well understood by means of the additional description and drawings which follow.

Figure 2:
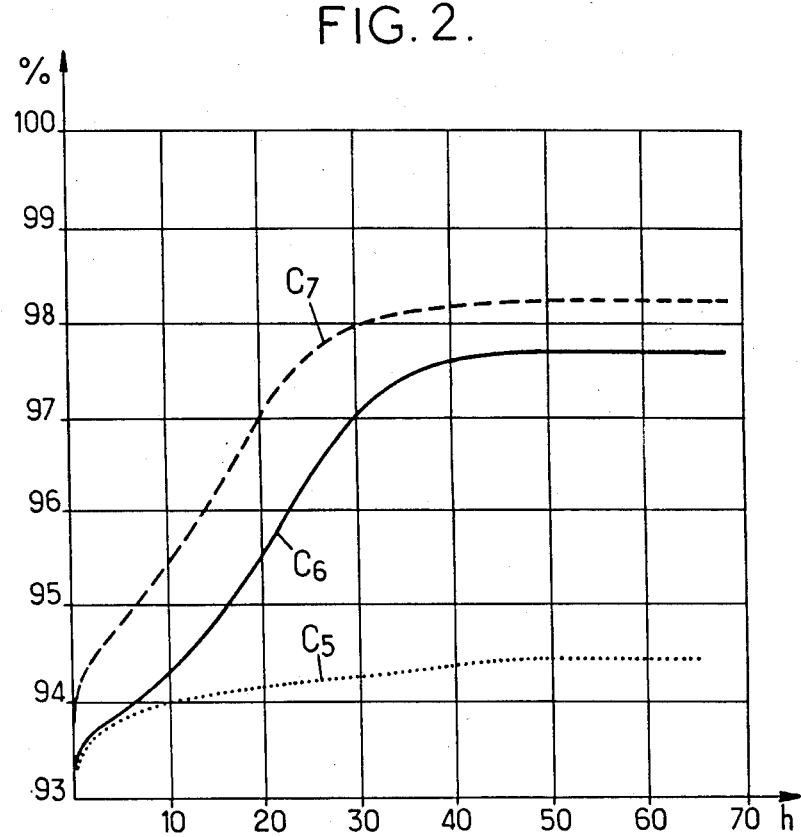

In these drawings, FIGS. 1 and 2 are graphical representations illustrating the drying kinetics of lozenges respectively based on sorbitol and on fructose.

Contemplating, consequently, the manufacture of pastilles of the lozenge type based on sorbitol or fructose, procedure is as follows or in similar manner.

First of all the dough is prepared by mixing, particularly inside an apparatus of the kneader type, the various ingredients, namely the crystalline sorbitol or fructose, the binder, the aromatizing agents and, optionally, the pharmaceutical active principles; recourse is had to means suitable for conferring on the dough thus obtained at the time of rolling and of drying a structure including cavities particularly microcavities uniformly distributed in the mass and at least some of which communicate with the surface.

The above-said means may be a physical or, preferably, a first chemical agent (particularly a carbonate and more particularly Na bicarbonate) of which the particles are distributed uniformly within the dough and which is decomposed from the rolling or drying step forward under the influence of heat and/or of a second chemical agent (particularly of an acid, more particularly organic, compatible with the future use of the lozenge type pastille), with the release of gas within the dough at the places where the constituent particles of the first chemical agent are located.

It is this gaseous release which is at the origin of the formation of the cavities or microcavities distributed within the dough.

The first chemical agent is advantageously constituted by Na bicarbonate; the second agent is advantageously gluconic acid preferably introduced in the form of gluconodeltalactone which, in the presence of the water entering into the constitution of the mixture, is progressively hydrolized into gluconic acid under the influence of carbon dioxide gas.

In order that the structure of the final pastille is as homogeneous as possible, that is to say in order that the distribution of the cavities distributed within its mass are as regular as possible, it is necessary for the distributions of the constituent particles of the first chemical agent and of the acid to be the most regular possible, which explains the need for intimate mixing of the various constituents.

It is advantageous to incorporate in the composition, in the mixer, first the acid and then partly or totally the first chemical agent; but it is also possible to add the first chemical agent before the acid, or at the same time, in a single step or in fractionated manner.

The carbonate and the acid are present, preferably, in respective proportions which satisfy the stoichiometry of the decomposition of the carbonate with the release of $CO_2$.

The modalities of the addition of the constituents of the means adapted to confer on the pastille the structure with cavities, are determined in order to avoid, as far as possible, losses of gas before the rolling of the dough.

Due to the progrressivity of its hydrolysis, gluconodeltalactone is particularly advantageous, the cavities being formed gradually and slowly in the dough, principally at the start of stoving.

Preferably, the amount of sodium bicarbonate employed is from 0.1 to about 5% and, more preferably still, from 0.2 to 1% by weight with respect to the total mass of the dough; the amount of gluconodeltalactone can be 0.047% to about 5%, preferably from 0.047% to 2.35% and, more particularly still, from 0.2 to 1.5% by weight with respect to the total mass of the dough.

The rolling and drying in the oven of the pastilles obtained by cutting up are carried out by means of conventional and tested techniques in this industrial field.

Details can be found on this subject in the examples.

The structure thus conferred on the final lozenge type pastilles is a structure including a plurality of cavities, particularly and preferably microcavities of which characteristics have been indicated above and due to which perfect drying in the mass as well as the obtaining of a regular surface, are rendered possible.

In the case of lozenge type pastilles with sorbitol, a smooth and regular homogeneous surface texture can be obtained fairly easily by the use on the one hand, of sorbitol of very fine granulometry less than 300 microns, preferably comprised between 30 and 200 microns and, on the other hand, preferably a binder system comprising, at least in part, gum tragacanth.

The incorporation of a plasticizing agent such as glycerol or, more preferably still, of a hydrogenated starch hydrolysate, enables the obtaining of a still more homogeneous surface, not showing small cracks occasioned by the rolling operation.

In the case of lozenge type pastilles with fructose, it is difficult to obtain a finished product of regular shape and homogeneous surface, by reason essentially of the tendency to "breakdown" of the structure of the wet lozenge based on fructose in the course of the stoving. In order to overcome this defect, it is desirable, mostly, to incorporate in the dough intended for the manufacture of the lozenge with fructose, a shape-retaining agent which can be selected particularly from among amylaceous, granular or pregelatinized agents, maltodextrins or cellulosic derivatives. These structure agents are used in a proportion comprised between 2 and 15% by weight with respect to the wet dough, preferably in a proportion comprised between 3 and 10% by weight. A preferred structure agent is constituted by a pre-gelatinized potato starch such as that which is marketed under the trademark "PRESOL 121" by Applicant Company.

EXAMPLE 1

Preparation of pastilles of the lozenge type according to the prior art respectively based on sorbitol and based on saccharose (a) Pastilles of the lozenge type based on sorbitol.

First a binder is prepared.

To do this, for 12 hours at 50° C., there is hydrated:

1.54 parts by weight of gum arabic dispersed in 1.03 parts by weight of water (60% by weight), 0.45 parts by weight of gum tragacanth dispersed in 3.64 parts by weight of water, then these constituents are mixed with a dispersion of 0.72 parts by weight of gelatin of the "100 Bloom" type in 0.72 parts by weight of water also brought to 50° C.

To this mixture of three constituents in water, are added, still at 50° C., 2.24 parts by weight of water, 4.16 parts by weight of hydrogenated starch hydrolysate with 75% of dry matter, for example that marketed under the trademark "LYCASIN 80/55", 1.33 parts by weight of pure glycerin, then the whole is introduced into a double jacketed kneader (for example that of the DVA type of the KUSTNER brand) containing 81.46 parts by weight of crystalline sorbitol possibly of the type which is marketed under the trademark NEOSORB ® P100T.

The mixing operation of the above-said solution with the crystalline sorbitol powder takes about 10 minutes, during which the kneader is cooled by tap water at room temperature which flows in the double jacket, in order that the temperature of the moist dough should not exceed 35°–40° C.

The wet dough is then rolled and, during the rolling, there is added by surface powdering, 1.66 parts by weight of mannitol.

The rolling can be carried out in an apparatus of the SYN.603 type of the RONDO brand.

The hydrolysate and the glycerine enable the small cracks of the surface during rolling to be avoided.

The rolled dough is cooled by means of a flow of cold air at the surface, the temperature passing from 29° C. to about 25° C., then it is cut up (stamped) by means of a cutting up tool.

The cooling enables the drying and slight hardening of the surface of the rolled dough, which facilitates the efficiency of the cutting up.

After the cutting up of the dough, the pieces obtained, that is to say the future lozenge type pastilles, are stoved at 45° C. and at 5–10% relative humidity (RH) for example in an apparatus of the A 368 type of the CAPIC brand.

The weight loss is measured at regular intervals and the content of dry matter of the product is determined.

The development of the dry matter content (d.m.) (in % by weight) as a function of time t (in hours) is shown on the graph of FIG. 1 by the curve $C_1$.

It appears, on examining this curve that the content of dry matter passes from the value of 91.24 at the moment 0 of drying to 96.23 at the end of about 70 hours; then the asymptotic development of the curve shows that it is not possible to exceed this value of dry matter and that the drying is stopped.

The lozenge type pastilles obtained after 70 hours of drying are dry and wrinkled at the surface, soft and moist in depth. Moreover, the dough is deformed. They do not constitute a marketable article of confectionery, comparable with those obtained with saccharose.

The apparent density of the lozenges obtained has been measured at 20° C., in corn oil, by means of a HUBBARD liquid pycnometer with a wide neck and a volume of 50 cm. It is equal in this case to 1.4268 g/cm³.

(b) Pastilles of the lozenge type with saccharose.

To prepare the binder, there is hydrated for 12 hours at 50° C.:

1.58 parts by weight of gum arabic dispersed in 1.05 parts by weight of water (60% by weight), 0.0055 parts by weight of gum tragacanth dispersed in 0.0445 parts by weight of water (11% by weight), then these constituents are mixed with a dispersion, also at 50° C., of 0.5 parts by weight of gelatin of 100 Bloom type in 0.5 parts by weight of water, the whole being completed by 5.65 parts by weight of water and kept at 50° C. until its introduction into a kneader of the above-said type containing 89.64 parts by weight of finely ground saccharose.

The whole is mixed intimately for 10 minutes then the dough is rolled in the above-indicated manner with surface dusting of 1 part by weight of potato starch.

The rolled dough is then is then cut up and stoved at 45° C. and at a relative humidity level equal to 5–10% inside the previsouly described oven.

The weight loss is measured at regular intervals and the dry matter content of the product is determined.

The development of the content of dry matter d.m. (in % by weight) as a function of the time t (in hours) is shown on the graph in FIG. 1 by the curve $C_2$.

It appears on examining this curve that the content of dry matter passes from the value of 92.75% at moment 0, that is to say at the beginning of drying, to the value of 98% after a drying time of about 45 hours.

The subsequent asymptotic development of the curve at this value of 98% indicates that the drying does not proceed further.

The pastilles of lozenge type so obtained are of regular shape, dried uniformly in the mass and pleasant on consumption.

Their apparent density, measured in the same way as previously, is found equal to: 1.0930 g/cm³.

(c) Comparison of the results according to (a) and (b).

In the case of the lozenge type pastilles obtained according to (a), the constituent mass of these pastilles contains at the end of drying:

$$100 - 96.23 = 3.77 \text{ parts by weight of water}$$

whereas at the start of drying it contained:
$$100 - 91.24 = 8.76 \text{ parts by weight of water.}$$

After drying, there remains therefore:

$$3.77/8.76 \times 100 = 43.04\%$$

of the water present at the start.

In the case of the pastilles according to (b), we have at the end of drying:

$$100 - 98 = 2 \text{ parts by weight of water}$$

at the beginning of drying:
$$100 - 92.75 = 7.25 \text{ parts by weight of water,}$$

which means that after drying there remains:

$$2/7.25 \times 100 = 27.59\% \text{ of the water of the start.}$$

It follows that, in the case of the pastilles according to (b), not only the drying is uniform, but it is also more thorough since an additional amount of:

$$43.04 - 27.59 = 15.45\% \text{ of water}$$

is removed.

EXAMPLE 2

Pastilles of the lozenge type with sorbitol, according to the invention

A binder solution based on gum arabic, gum tragacanth and gelatin is prepared in a manner identical with that which is indicated in example 1(a).

To the mixture thus formed, is added, keeping the temperature still at 50° C.:

0.52 parts by weight of gluconodeltalactone
2.24 parts by weight of water
4.16 parts by weight of hydrogenated starch hydrolysate with 75% of dry matter, for example that marketed under the trademark LYCASIN ® 80/55
1.33 parts by weight of pure glycerin.

The resulting solution is introduced into the kneader previously used and which contains:

81.47 parts by weight of crystalline sorbitol for example that marketed under the trademark NEOSORB ® P100T
0.52 parts by weight of Na bicarbonate, the whole having previously been intimately mixed by kneading of 3 minutes.

The mixture of the binder solution and of the sorbitol is then kneaded for 10 minutes, the kneader being cooled with tap water by means of a water circulation in the double jacket in order that the temperature of the wet dough does not exceed 35°-40° C.

The wet dough is then rolled in the above identified apparatus.

During the rolling there is added, 1.66 parts by weight of mannitol by surface dusting.

It is observed that the surface of the dough does not crack during the rolling.

The rolled dough is cooled superficially by means of a cold air flow which enables the temperature of the dough to be lowered from 29° to 25° C. approximately.

The dough is then cut up by means of a suitable cutting up tool.

The still moist future pastilles are placed in an oven for 4 hours at 30° C. and in a relative humidity of 20%; then the drying is finished at 45° C. for 61 hours and at a relative humidity of 5 to 10%.

The thus stoved lozenge type pastilles are perfectly dry and have a plurality of microcavities. Their apparent density is found to be equal to 1.2802 g/cm$^3$.

By comparison with the lozenges with sorbitol manufactured in example 1a, it is observed that the apparent density of the lozenges according to the invention is 10.28% lower.

The texture of the product so obtained was unanimously appreciated by a group of six tasters.

During the drying, the loss in weight was determined at regular intervals.

In the same way as the curves $C_1$ and $C_2$, the curve $C_3$ of FIG. 1 shows the development of dry matter as a function of time.

From examination of this curve, it results that the content of dry matter passes from 91.33% on start of drying to a value of 98.08 after 65 hours; the curve is then asymptotic.

When the drying progresses no further, there remains therefore:

100−98.08=1.92% of water against:

100−91.33=8.67% of water at the start, which signifies that after drying there remains:

1.92/8.67×100=22.15% of the water present at the start.

In comparison with the result according to the example 1(b) it is observed that the drying is more effective, an additional amount of 27.59−22.15=5.44% water being removed.

As a modification, the preceding dough was subjected to a different drying consisting of subjecting it to a temperature of 45° C. for 45 hours, the humidity ratio of the air being from the start about 5-10%.

During the drying, the loss in weight was determined at regular intervals.

In the same way as curves $C_1$ to $C_3$, the curve $C_4$ shows the development of the content of dry matter as a function of the time.

From examination of the curve $C_4$, it results that the drying proceeds no further after the 45th hour at which the content of dry matter has reached the limiting value of 98.2.

The microcavities formed are coarser and the apparent density is 0.8895 g/cm$^3$ after drying, namely a reduction of 37.66% with respect to the density of the lozenges with sorbitol manufactured in example 1a.

The texture is considered by the tasters as being coarser.

It follows that the formation of microcavities of the smaller regular dimensions, in other words the obtaining of a fine texture, is facilitated by drying in two steps only the second of which is carried out at a humidity content in the vicinity of 5-10%.

EXAMPLE 3

Lozenge type pastilles with fructose (a) Case of a formula according to the prior art, but including a structure agent.

To prepare the binder, there is hydrated for 12 hours at 50° C.:

0.05 parts by weight of gum tragacanth dispersed in 0.45 parts by weight of water (10% by weight)
4.02 parts by weight of gum arabic dispersed in 4.02 parts by weight of water (50% by weight), then the two dispersions were mixed with:

3.09 parts by weight of maltodextrin of DE (dextrose-equivalent) 20, the solution thus obtained being introduced into a kneader which can be that identified in the preceding examples and which contains an intimate mixture of:

79.08 parts by weight of fructose with 2% moisture,
8.66 parts by weight of pregelatinised potato starch with 7.2% moisture, for example that of the trademark PRESOL ® 121 marketed by Applicant Company.

The mixing operation is carried out for about 10 minutes, the kneader being maintained at 40° C. by means of a hot water circulation in the double jacket.

The moist dough is then rolled and during the rolling 0.68 parts of potato starch was added by surface dusting.

The dough is flexible and does not crack during rolling.

The rolled dough is then cooled superficially by means of a cold air flow which enables the temperature of the dough to be lowered to a value at which it has sufficient hardness for cutting up.

The latter is done by means of a suitable cutting up tool.

Once the dough is cut up, the still moist future pastilles are placed in a ventilated oven at 45° C., the moisture level being from 5 to 10%.

The stoved product only dries superficially and remains moist and soft at its center after 50 hours. The lozenge obtained has an irregular shape.

The apparent density, measured after 50 hours of drying is 1.4557 g/cm$^3$.

The weight loss during the drying is measured at regular intervals and the content of the dry matter of the product is determined.

The development of the content of dry matter d.m. (in % by weight) as a function of the time t (in hours) is shown on the graph of FIG. 2 by the curve $C_5$.

It appears on examining this curve that the content of dry matter starts from the value of 93.33 at the moment 0 of drying.

The asymptotic development of this curve shows that it is not possible to exceed a dry matter ratio of 94.43%, which value is reached after about 50 hours and at which the drying is stopped.

At the end of drying, the lozenge type pastille contains $100-94.43=5.57\%$ of water whereas initially there was $100-93.33=6.67\%$.

There remains therefore:

$5.57/6.67 \times 100 = 83.51\%$ of the water initially present in the moist dough.

(b) Case of a formula according to the invention including Na bicarbonate, gluconodeltalactone and a structure agent.

To prepare the binder, there was hydrated for 12 hours at 50° C.:

0.05 parts by weight of gum tragacanth dispersed in 0.45 parts by weight of water (10% by weight), 4.02 parts by weight of gum arabic dispersed in 4.02 parts by weight of water (50% by weight), then the two dispersions are mixed with: 3.09 parts by weight of maltodextrin of a dextrose-equivalent DE equal to 20, 0.43 parts by weight of gluconodeltalactone, the solution thus obtained being introduced into a kneader which can be that identified in the preceding examples and which contains an intimate mixture of:

78.2 parts by weight of fructose with 2% moisture, 0.43 parts by weight of Na bicarbonate and 8.66 parts by weight of pregelatinised potato starch with 7.2% of moisture, for example that of the trademark PRESOL ® 121.

The mixing, rolling and drying operations were carried out in the same way as previously.

It is observed this time that the stoved product is perfectly dry, includes regularly distributed microcavities, is pleasant to suck and possesses a slight caramel taste. However, the shape is slightly bulged at the surface.

The apparent density if 0.9628 g/cm$^3$. It is hence less by about 33.9% than that of the lozenge manufactured in the example 3(a) according to the prior art.

The weight loss during drying was here again measured at regular intervals and the content of dry matter of the product determined.

The development of the content of dry matter d.m. (in % by weight) as a function of the time t (in hours) is shown in the graph of FIG. 2 by the curve $C_6$.

From examination of this curve, it results that, from a value of 93.34% at the start of drying, the content of dry matter passes to 97.71% after a period of drying of 40 to 45 hours. The curve then becomes asymptotic.

There remains finally:

$$100-97.71=2.29\%$$

of residual water, in other words:

$$\frac{2.29}{100-93.34} \times 100 = 34.38\%$$

of the water initially contained in the still moist dough.

This water is uniformly distributed and the drying is homogenous.

(c) Case of a formula identical to that of example 3(b) but not including a structure agent.

The same dough as under (b) was prepared, but without however, providing the presence of pregelatinised potato starch, replaced in the formula by an additional amount of fructose (namely 86.4 parts of fructose with 2% moisture).

The weight loss was again measured.

The development of the content of dry matter as a function of time is shown by the curve $C_7$.

From examination of this curve, it appears that from a value of 93.79% at the start of drying, the content of dry matter passes to 98.26 after about 45 hours, after which the content of dry matter becomes asymptotic.

The dry product (after 45 hours) has a highly flattened shape, indicating the absence of structure agent, the surface being bulged.

The density at the end of the experiment was 1.0192, namely less by 30% than that of the product obtained according to 3(a).

The tasting group described this product as brittle, pleasant to suck and having a slight caramel flavour.

From the above-said values of the content of dry matter, it results that $100-98.26=1.74\%$ of the water remains in the product which represents:

$$\frac{1.74}{100-93.79} \times 100 = 28.0\%$$

of water of the moist dough.

This water is uniformly distributed in the lozenge and the drying is homogeneous.

I claim:

1. Process for the manufacture of a lozenge comprising sorbitol or fructose and a binder having a dry mass and an even surface comprising the successive steps of
   (i) preparing a binder solution comprising hydrated gum, gelatin, water, and optionally starch,
   (ii) preparing a dough by initimately mixing said binder solution with a major amount of crystalline sorbitol or fructose, about 0.1 to 5% by weight with respect to the total mass of the dough of a carbonate in the form of particles which releases $CO_2$ on decomposition, and a stoichiometric amount of an organic acid so as to distribute the carbonate particles and the acid throughout the dough as regular as possible and cause reaction of said carbonate and said acid to release carbon dioxide, (iii) rolling the dough in the form of a layer of thickness selected in advance, (iv) hardening the surface of the rolled dough, (v) cutting it up into lozenges of the desired shape, and (vi) drying the thus obtained lozenges, to provide a lozenge having said even surface and dry mass and having a plurality of homogeneously distributed microcavities at least some of which communicate with the surface of the lozenge.

2. Process according to claim 1, wherein the carbonate is sodium bicarbonate and the organic acid is gluconic acid in the form of gluconodeltalactone, the proportions of sodium bicarbonate and of gluconodeltalactone being respectively from 0.1 to about 5% by weight and from 0.047 to about 5% by weight with respect to the total mass of the dough.

3. Process according to claim 1, wherein the carbonate is sodium bicarbonate and the organic acid is gluconic acid in the form of gluconodeltalactone, the proportions of sodium bicarbonate and of gluconodeltalactone being respectively from 0.2 to about 1% by weight and from 0.2 to about 1.5% by weight with respect to the total mass of the dough.

4. Process according the claim 2 comprising further incorporating in the dough a moist shape retaining agent selected from the group consisting of amylaceous granular or pregelatinized agents, pregelatinized potato starch, maltodextrine or cellulosic derivatives, in an amount of between 2 and 15% by weight with respect to the wet dough, said amount being sufficient to prevent the breakdown of the structure of the wet lozenge.

5. Process according to claim 4, wherein the carbonate is sodium bicarbonate and the organic acid is gluconic acid in the form of gluconodeltalactone, the proportions of sodium bicarbonate and of gluconodeltalactone being respectively from 0.2 to about 1% by weight and from 0.2 to about 1.5% by weight with respect to the total mass of the dough and the proportion of the shape retaining agent being comprised between 3 and 10% by weight with respect to the wet dough.

6. A lozenge comprising crystalline sorbitol or fructose obtained by the process according to one of claims 2 to 4.

* * * * *